United States Patent
Chen

(10) Patent No.: US 10,710,437 B2
(45) Date of Patent: Jul. 14, 2020

(54) ADJUSTABLE FIXTURE FOR A COVER PLATE OF A PICKUP TRUCK

(71) Applicant: Ningbo Motorman E-commerce Co.,Ltd., Ningbo, Zhejiang Province (CN)

(72) Inventor: Weizhen Chen, Ningbo (CN)

(73) Assignee: Ningbo Motorman E-commerce Co., Ltd., Ningbo, Zhejiang (CN)

( * ) Notice: Subject to any disclaimer, the term of this patent is extended or adjusted under 35 U.S.C. 154(b) by 127 days.

(21) Appl. No.: 16/193,182

(22) Filed: Nov. 16, 2018

(65) Prior Publication Data

US 2020/0156450 A1 May 21, 2020

(51) Int. Cl.
  *B60P 7/04* (2006.01)
  *B60J 7/19* (2006.01)
  *F16B 2/12* (2006.01)

(52) U.S. Cl.
  CPC .............. *B60J 7/198* (2013.01); *F16B 2/12* (2013.01)

(58) Field of Classification Search
  CPC .......... B60J 7/198; B60J 10/90; B60J 7/1607; E05C 3/16
  See application file for complete search history.

(56) References Cited

U.S. PATENT DOCUMENTS

| | | | | |
|---|---|---|---|---|
| 5,472,256 A * | 12/1995 | Tucker | .................... | B60J 7/102 296/100.18 |
| 5,540,478 A * | 7/1996 | Schuch | .................... | B60J 7/04 224/331 |
| 7,204,540 B2 * | 4/2007 | Wheatley | ................ | B60J 7/102 296/100.16 |
| 7,252,322 B2 * | 8/2007 | Rusu | ..................... | B60J 7/1621 296/100.07 |
| 7,607,714 B2 * | 10/2009 | Wheatley | ................ | B60J 7/062 296/100.15 |
| 9,073,417 B1 * | 7/2015 | Smith | ...................... | B60J 7/198 |
| 2004/0124658 A1 * | 7/2004 | Wheatley | ................ | B60J 7/102 296/98 |
| 2006/0006669 A1 * | 1/2006 | Nelsen | ................. | E05B 85/243 292/216 |
| 2017/0361692 A1 * | 12/2017 | Corder | ..................... | E05C 3/16 |
| 2019/0193538 A1 * | 6/2019 | Carter | .................... | B62D 33/03 |
| 2019/0315209 A1 * | 10/2019 | Lewis | ..................... | B60J 7/141 |
| 2020/0062095 A1 * | 2/2020 | Xu | ........................ | B60J 10/90 |

* cited by examiner

*Primary Examiner* — Amy J. Sterling
(74) *Attorney, Agent, or Firm* — Craft Chu PLLC; Andrew W. Chu

(57) ABSTRACT

The adjustable fixture for a cover plate of a pickup truck includes a mounting seat, a sliding seat and a sliding block. The lower end of the mounting seat is provided with a horizontal sliding slot, and the lengthwise direction of the horizontal sliding slot is parallel to the lengthwise direction of the mounting seat. The sliding seat is engaged in and slidable in the horizontal sliding slot, and is provided with a first elongated slot. The sliding block is engaged in and slidable in the sliding seat A quick-detachable component passes through the first elongated slot and is connected with said sliding block. A tension spring is provided between the sliding block and the sliding seat. The upper end plane of the sliding block extends rearwards so as to form a connection part, and an end of the connection part bends upwards so as to form a clamping part.

9 Claims, 7 Drawing Sheets

16
ADJUSTABLE FIXTURE FOR A COVER PLATE OF A PICKUP TRUCK

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a cover plate of a pickup truck, and specifically to an adjustable fixture used for a cover plate of a pickup truck.

2. Description of Related Art Including Information Disclosed Under 37 CFR 1.97 and 37 CFR 1.98

Pickup truck is a vehicle model that uses the front-body and the driving cab of a car and in the meantime has an open-type freight carriage. Its characteristics lie in that it is as comfortable as a car, it has a powerful driving force, and it has better abilities of carrying freight and coping with bumpy roads. The most common pickup truck type is the crew cab pickup truck. A pickup truck can be used as a special vehicle, a multipurpose passenger vehicle, a business vehicle, a commercial vehicle or a family use vehicle; and a pickup truck can be used for carrying freight, traveling, taxiing and the like. The truck bucket located at the rear of the pickup truck is a very important component, which is used for carrying freight. In order to avoid exposing the cargos in the truck bucket and to protect them from the sun and rain, a cover plate can be provided on the truck bucket to avoid exposing to the sun and rain, thus improving the protection to the cargos. Conventional cover plates have poor universality, and are usually customized cover plates, which are unalterable in terms of mounting and fixation.

BRIEF SUMMARY OF THE INVENTION

The technical problem sought to be solved by the invention

The technical problem sought to be solved by the invention is to provide an adjustable fixture used for a cover plate of a pickup truck, which has a simple structure and is convenient to mount.

The technical solution applied by the invention to solve such technical problem

The present invention provides an adjustable fixture used for a cover plate of a pickup truck, comprising:

a mounting seat 2; wherein the rear portion of said mounting seat is provided with a fastening block 21, said fastening block is provided with a mounting hole 210, the head of said mounting seat is provided with a fixture block 23, the lower end of said mounting seat is provided with a horizontal sliding slot, the lengthwise direction of said horizontal sliding slot is parallel to the lengthwise direction of said mounting seat;

a sliding seat 3, which is engaged in and slidable in said horizontal sliding slot; wherein said sliding seat is provided with a first elongated slot 362 that is vertically arranged with respect to said horizontal sliding slot;

a sliding block 4, which is engaged in and slidable in said sliding seat; wherein the sliding direction of said sliding block is vertical to the sliding direction of said sliding seat, a quick-detachable component passes through said first elongated slot and is connected with said sliding block, a tension spring 5 is provided between said sliding block and said sliding seat, said tension spring makes said sliding block have an upward movement tendency, the upper end plane of said sliding block extends rearwards so as to form a connection part 42, and an end of said connection part bends upwards so as to form a clamping part 43.

Further, an elongated slot that is parallel to said horizontal sliding slot travels through the upper and lower ends of said mounting seat; the number of said elongated slot is two, and said elongated slots are symmetrically arranged at both sides of said horizontal sliding slot; a U-shape clamp passes through said elongated slot and is secured to the sliding seat that is engaged in and slidable in the lower end of said mounting seat.

Further, both sides of said sliding seat are provided with a positioning protrusion 31 and a first through-hole 33 located at the upper end of said positioning protrusion; the end of said U-shape clamp is provided with a positioning groove corresponding to said positioning protrusion and a second through-hole coaxial with said first through-hole; the first bolt 81 sequentially passes through said first through-hole and the second through-hole and then is connected to a first screw nut 82 that is mounted on said sliding seat.

Further, upper end of said first elongated slot is provided with a tension spring slot 361 that allows the tension spring to pass through; said tension spring slot extends upwards to the top surface of said sliding seat; the top of said sliding seat is horizontally provided with a cross-bar 34 for accommodating the tension spring; both sides of said tension spring slot are provided with a recess for accommodating the first screw nut; said recess is coaxial with said first through-hole.

Further, said sliding block 4 comprises a sliding block body 41; both sides of said sliding block body extend forwards to form a slide abutting part 412; opposite sides of these two slide abutting parts are provided with a sliding groove 411; both sides of said sliding seat 3 are provided with a sliding rail 35 corresponding to said sliding groove; the front end of said sliding block is provided with a tension spring mounting seat 421, said tension spring mounting seat is located between those two slide abutting parts; said tension spring mounting seat is provided with a hole 422 for mounting the tension spring.

Further, said quick-detachable component comprises a second bolt 62, a second screw nut 61, a gasket and a driving lever 7; said second bolt sequentially passes through said gasket, said first elongated slot and said sliding block and then is connected with said second screw nut; said driving lever is rotationally hinged to the head of said second bolt through a pin roll 63; the root of said driving lever has an arc-shaped face and is eccentrically biased towards the rotation axis of said driving lever.

Further, said mounting seat is provided with a lightening hole 222.

Further, said mounting seat is provided with a strip-shaped recess 221 for enhancing the structural strength; the lengthwise direction of said strip-shaped recess is parallel to the lengthwise direction of said mounting seat.

Further, the lower end of said fixture block is provided with a mounting groove that is parallel to the lengthwise direction of said mounting seat; the end of said mounting groove extends towards the outside of said fixture block; and the bottom surface of said mounting groove is an oblique plane.

Advantageous Effects

The adjustable fixture used for a cover plate of a pickup truck according to the present invention has a simple and compact structure, is convenient to be mounted, has a light weight and high strength, enables both horizontal adjustment and vertical adjustment in order to accommodate different types of truck buckets of pickup trucks, has great universality, and can realize quick fixation.

DETAILED DESCRIPTION OF THE INVENTION

In the following, the invention will be explained in details with reference to the accompanying drawings.

Figure 1:
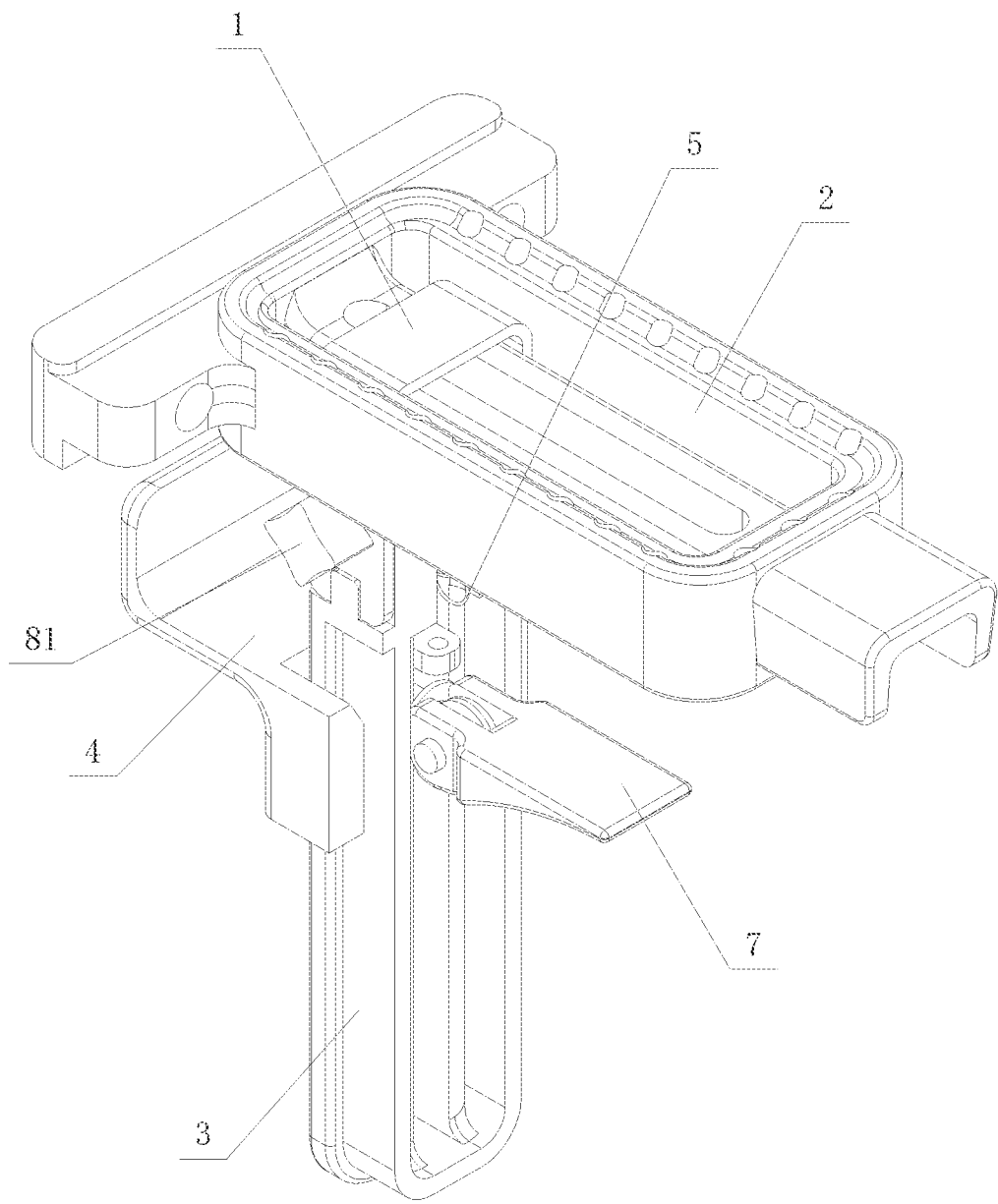
FIG. 1 is an upper perspective view of the adjustable fixture used for a cover plate of a pickup truck according to the present invention.
Figure 2:
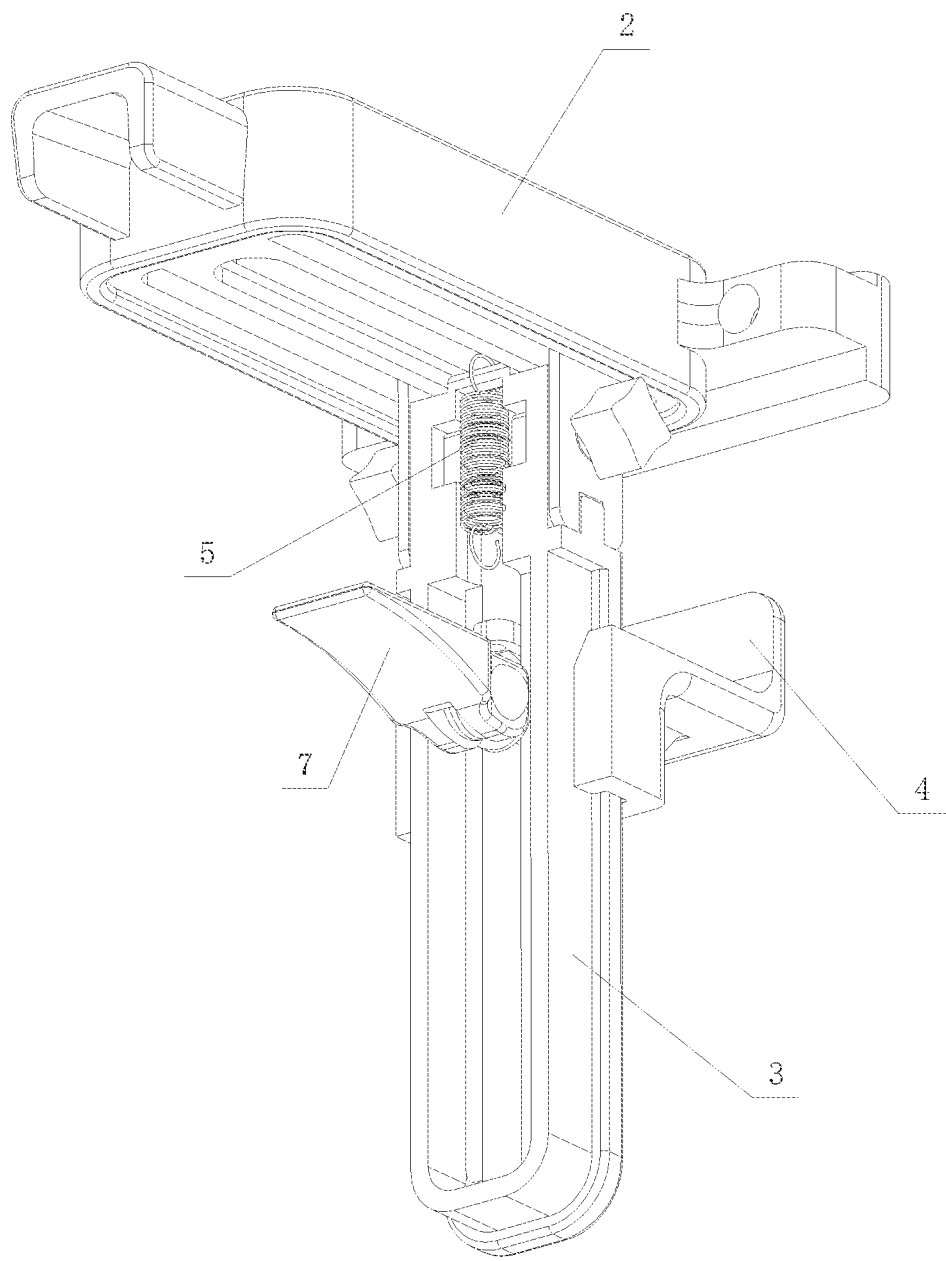
FIG. 2 is a lower perspective view of the adjustable fixture used for a cover plate of a pickup truck according to the present invention, viewed from another angle.
Figure 3:
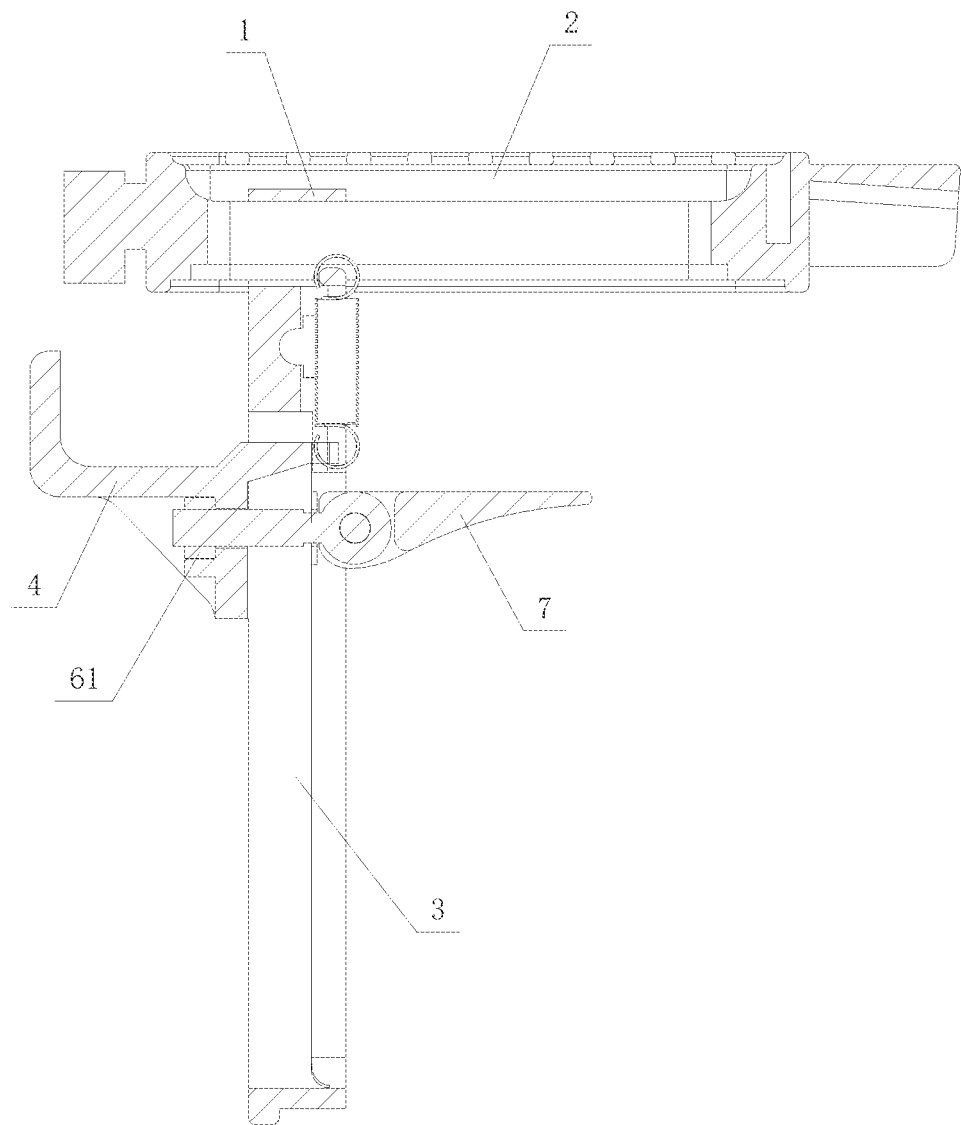
FIG. 3 is a sectional view of the adjustable fixture used for a cover plate of a pickup truck according to the present invention.
Figure 4:
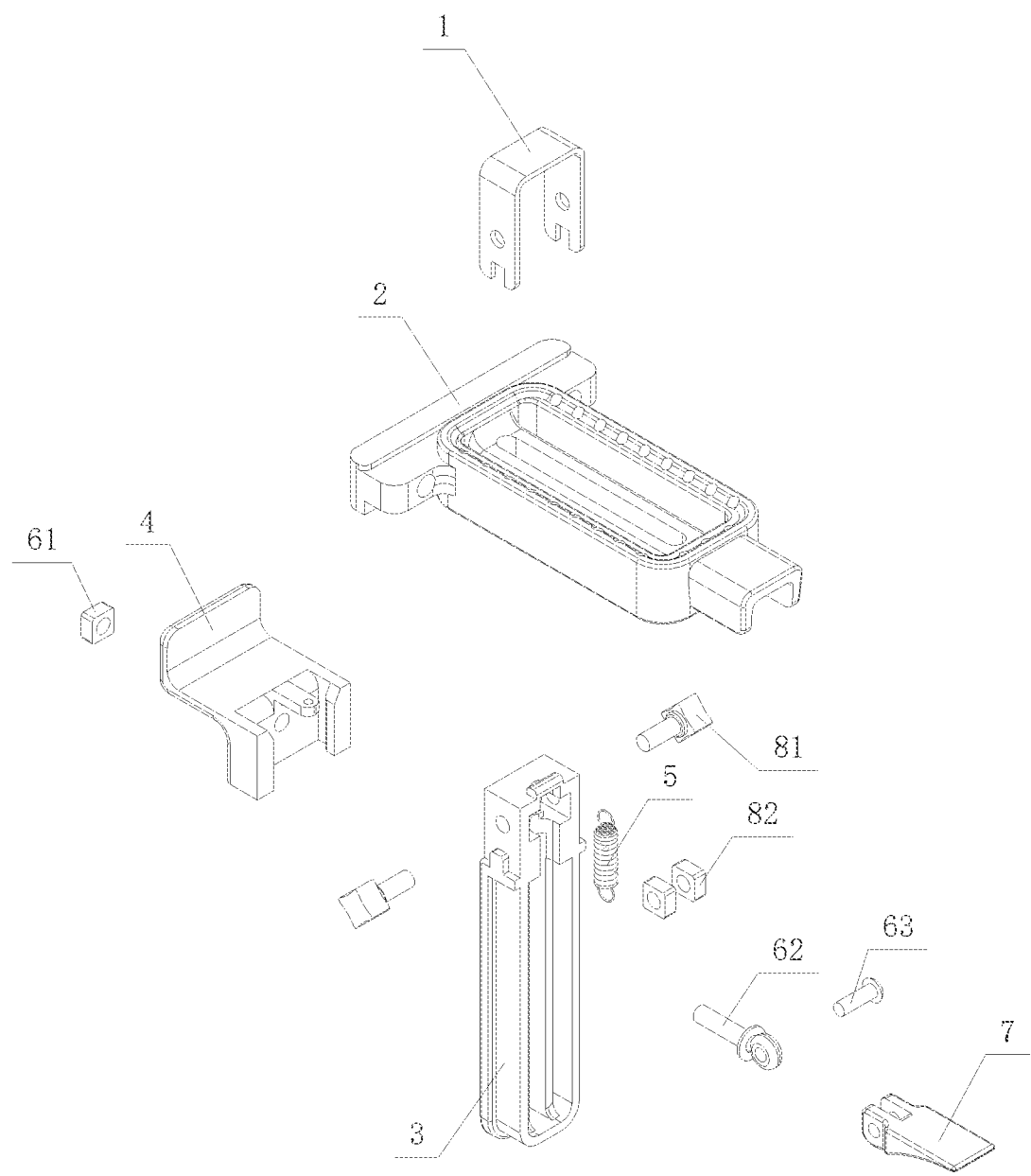
FIG. 4 is an exploded perspective view of the adjustable fixture used for a cover plate of a pickup truck according to the present invention.
Figure 5:
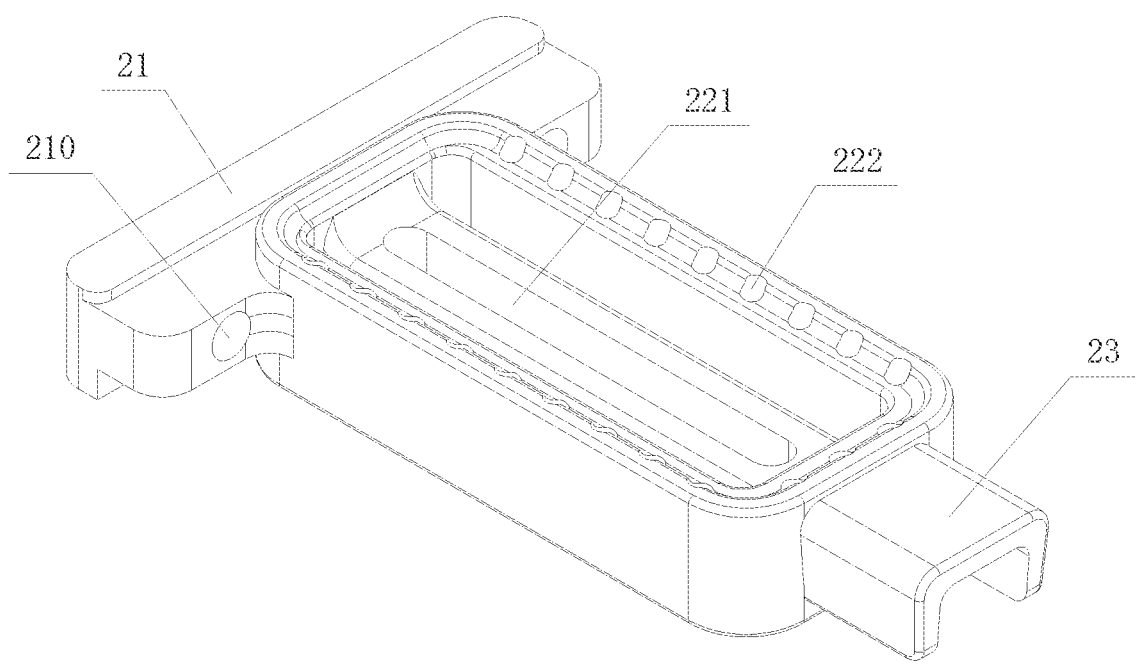
FIG. 5 is a perspective view of the mounting seat of the adjustable fixture used for a cover plate of a pickup truck according to the present invention.
Figure 6:
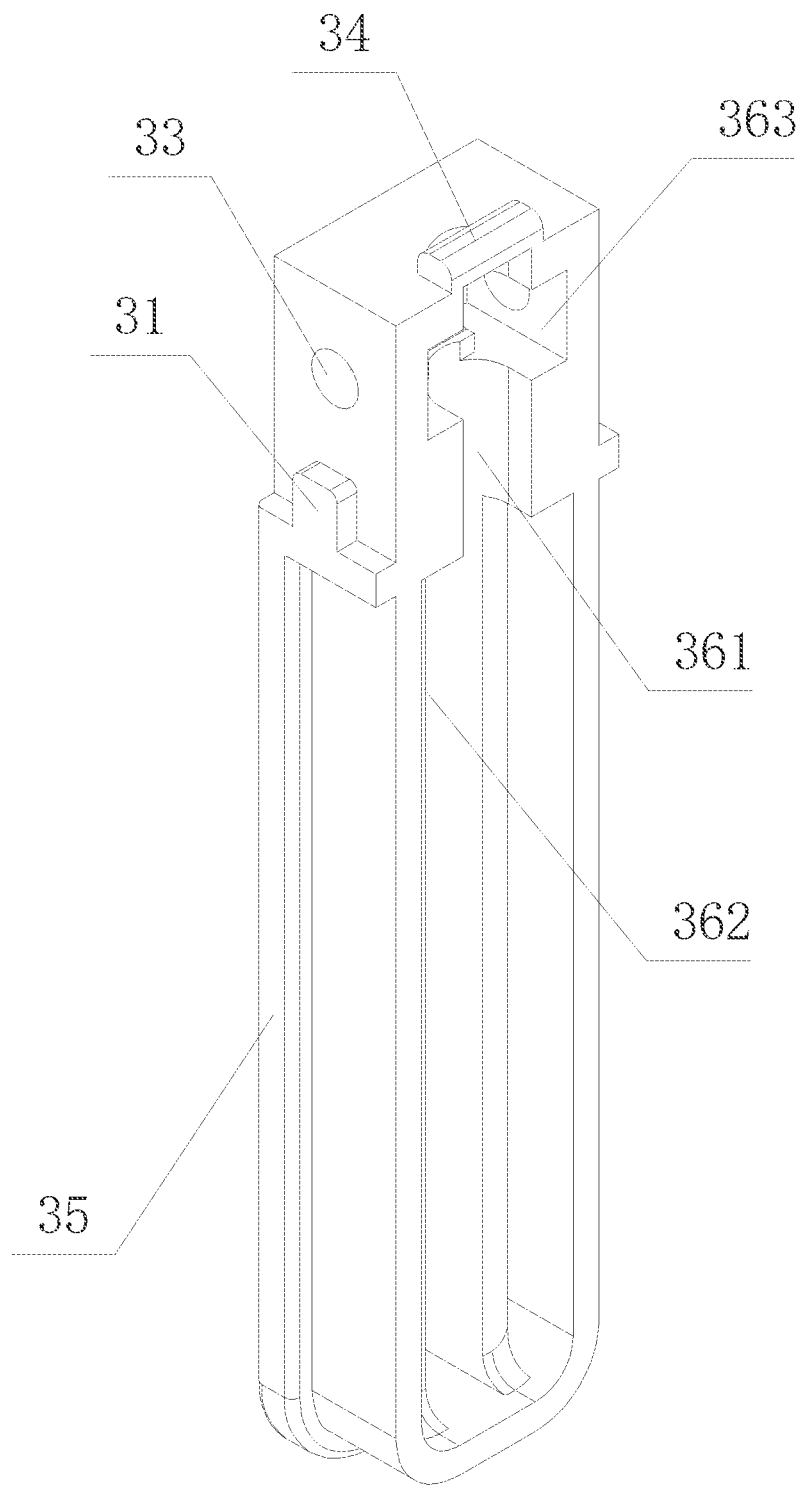
FIG. 6 is a perspective view of the sliding seat of the adjustable fixture used for a cover plate of a pickup truck according to the present invention.
Figure 7:
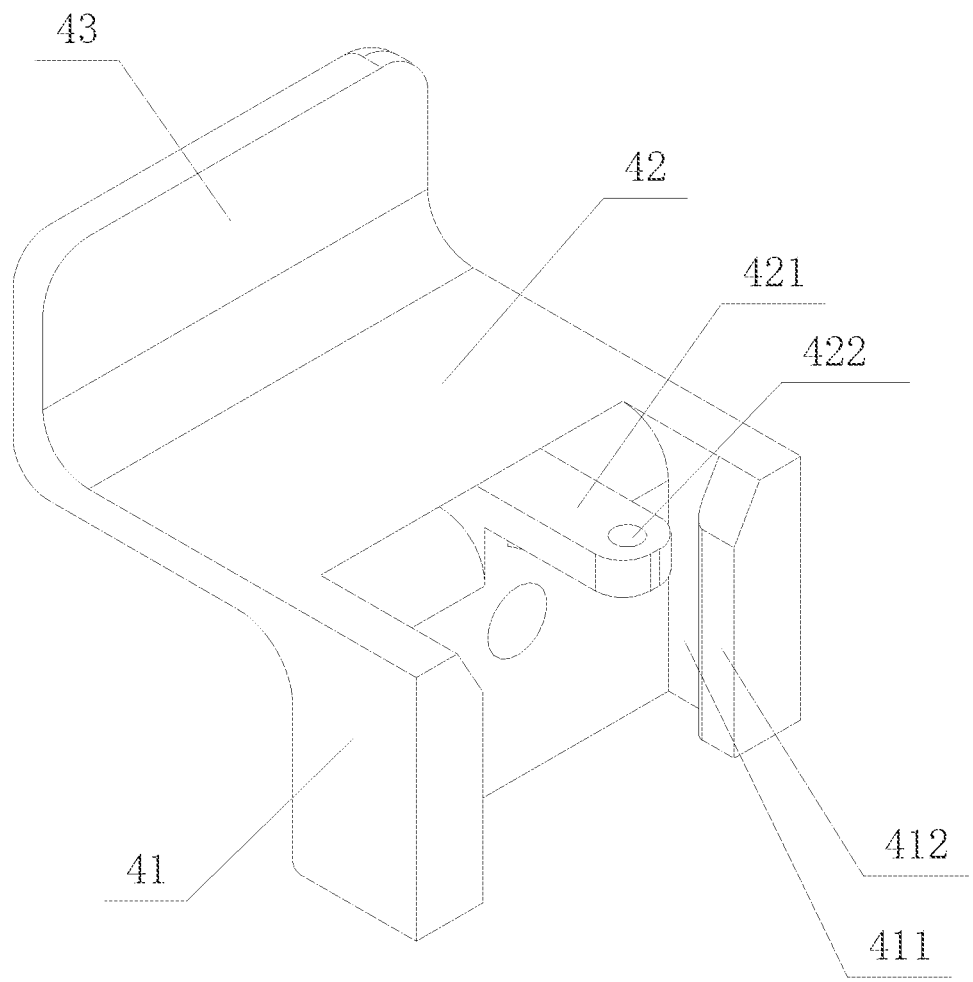
FIG. 7 is a perspective view of the sliding block of the adjustable fixture used for a cover plate of a pickup truck according to the present invention.

Referring to FIG. 1 to FIG. 7, the present invention provides adjustable fixture used for a cover plate of a pickup truck, which comprises a mounting seat 2, a sliding seat 3 and a sliding block 4.

The mounting seat is horizontally arranged. At the rear portion of the mounting seat, there is a fastening block 21; the fastening block is cuboid-shaped as a whole; said fastening block is provided with mounting holes 210. The number of the mounting hole is two, which are symmetrically arranged at both sides of the fastening block. The head of the mounting seat is provided with a fixture block 23. The lower end of said fixture block is provided with a mounting groove that is parallel to the lengthwise direction of said mounting seat; the end of said mounting groove forwardly extends towards the outside of said fixture block; and the bottom surface of said mounting groove is an oblique plane, which tilts downwards from inside (the root) to outside and intersects with the horizontal plane with an angle that is no less than 3 degrees and less than 10 degrees. During the mounting procedure, the fixture block is inserted into a groove on the cover plate, the fastening block is engaged into another groove on the cover plate, and is secured by a bolt. The lower end of said mounting seat is provided with a horizontal sliding slot, the lengthwise direction of said horizontal sliding slot is parallel to the lengthwise direction of said mounting seat. In order to reduce the total weight, the mounting seat is provided with a lightening hole 222. In this embodiment, such lightening hole is formed on the upper surface of the mounting seat along the profile of the mounting seat. The bore diameter of the lightening hole is larger than 2 mm and smaller than 8 mm, so that not only the total weight is reduced, and but also the structural strength is improved; in order to further improve the structural strength, the mounting seat is provided with a strip-shaped recess 221, and the lengthwise direction of the strip-shaped recess is parallel to the lengthwise direction of the mounting seat. An elongated slot that is parallel to the horizontal sliding slot travels through the upper and lower ends of the mounting seat; the number of the elongated slot is two, and said elongated slots are symmetrically arranged at both sides of the horizontal sliding slot; a U-shape clamp passes through the elongated slot and is secured to the sliding seat that is engaged in and slidable in the lower end of the mounting seat. Upper end of the U-shape clamp contacts the top face of the mounting seat, and its contacting face can be a flat plane or a arc-shaped plane.

The sliding seat 3 is horizontally engaged in and slidable in the bottom end of the mounting seat. The sliding seat is provided with a first elongated slot 362 that is vertically arranged with respect to the horizontal sliding slot 2. Specifically, both sides of the sliding seat are provided with a positioning protrusion 31 and a first through-hole 33 located at the upper end of the positioning protrusion. The end of the U-shape clamp is provided with a positioning groove corresponding to the positioning protrusion and a second through-hole coaxial with the first through-hole. Such positioning protrusion is upward positioned, which is used for quick positioning of the U-shape clamp, i.e. realizing a quick aligning of the first through-hole and the second through-hole. The first bolt 81 sequentially passes through the first through-hole and the second through-hole and then is connected to a first screw nut 82 that is mounted on the sliding seat. Upper end of the first elongated slot is provided with a tension spring slot 361 that allows the tension spring to pass through; the tension spring slot extends upwards to the top surface of the sliding seat. Meanwhile, the top of the sliding seat is horizontally provided with a cross-bar 34 for accommodating the tension spring; the cross-bar is located inside the horizontal sliding slot of the mounting seat, thus enabling a function of right-left position limitation. A function of up-down position limitation is fulfilled by means of the U-shape clamp. Both sides of the tension spring slot are provided with a recess for accommodating the first screw nut; the recess is coaxial with the first through-hole, thus facilitating the assembly. In order to realize quick manual assembly and detachment, the head of the first bolt is provided with a tightening part used for manual tightening, which is equilateral polygon, and can be manually operated in case that there is no tools available.

The sliding block 4 is vertically engaged in and slidable in the sliding seat, and the sliding direction of the sliding block is vertical to the sliding direction of the sliding seat; further, the sliding trajectories of those two are vertical to each other and intersect with each other. A quick-detachable component passes through the first elongated slot and is connected with the sliding block, which is used for quickly releasing or fixing the sliding block, thus realizing quick fixation. In this embodiment, the quick-detachable component comprises a second bolt 62, a second screw nut 61, a gasket and a driving lever 7; the second bolt sequentially passes through the gasket, the first elongated slot and the sliding block and then is connected with the second screw nut by means of threaded connection. The driving lever is rotationally hinged to the head of the second bolt through a pin roll 63; the root of the driving lever has an arc-shaped face and is eccentrically biased towards the rotation axis of the driving lever. The rotation of the driving lever is used to axially tighten or loosen the second bolt, thus enabling quick adjustment and fixation. A tension spring 5 is provided between the sliding block and the sliding seat; the tension spring makes the sliding block have an upward movement tendency; the upper end plane of the sliding block extends rearwards so as to form a connection part 42; and an end of the connection part bends upwards so as to form a clamping part 43 for connecting the rim of truck buckets of pickup trucks. Specifically, the sliding block 4 comprises a sliding block body 41; both sides of the sliding block body extend forwards to form a slide abutting part 412; opposite sides of these two slide abutting parts are provided with a sliding groove 411; both sides of the sliding seat 3 are provided with a sliding rail 35 corresponding to the sliding groove. The sliding rail protrudes in a strip shape, for facilitating the assembly. Bottom end of the sliding seat has a circular arc shape; sliding rails on both sides are connected with each other. The front end of the sliding block is provided with a tension spring mounting seat 421; the tension spring mounting seat is located between those two slide abutting parts and passes through the first elongated slot of the sliding seat; the tension spring mounting seat is provided with a hole 422 for mounting the tension spring. One end of the tension spring is secured on the tension spring mounting seat, and the other end is secured on the cross-bar.

In order to facilitate the operation, a locking state is enabled when the driving lever is pulled down, and a released state is enabled when the driving lever is pushed up.

The adjustable fixture used for a cover plate of a pickup truck according to the present invention has a simple and compact structure, is convenient to be mounted, has a light weight and high strength, enables both horizontal adjustment and vertical adjustment in order to accommodate rims of different types of truck buckets of pickup trucks, has great universality, and can realize quick fixation.

The above descriptions are only some preferred embodiments, and it should be pointed out that, as for a person skilled in the art, modifications and alternatives can be made without departing from the discipline of the invention, and such modifications and alternative also fall within the scope of the invention.

I claim:

1. An adjustable fixture for a cover plate of a pickup truck, comprising:
   a mounting seat, wherein a rear portion of said mounting seat is provided with a fastening block, wherein said fastening block is provided with a mounting hole, wherein the head of said mounting seat is provided with a fixture block, wherein the lower end of said mounting seat is provided with a horizontal sliding slot, and wherein the lengthwise direction of said horizontal sliding slot is parallel to the lengthwise direction of said mounting seat;
   a sliding seat, which is engaged in and slidable in said horizontal sliding slot, wherein said sliding seat is provided with a first elongated slot that is vertically arranged with respect to said horizontal sliding slot; and
   a sliding block, which is engaged in and slidable in said sliding seat, wherein the sliding direction of said sliding block is vertical to the sliding direction of said sliding seat, wherein a quick-detachable component passes through said first elongated slot and is connected with said sliding block, wherein a tension spring is provided between said sliding block and said sliding seat, wherein said tension spring makes said sliding block have an upward movement tendency, wherein the upper end plane of said sliding block extends rearwards so as to form a connection part, and wherein an end of said connection part bends upwards so as to form a clamping part.

2. The adjustable fixture for a cover plate of a pickup truck according to claim 1, further comprising:
   an elongated slot that is parallel to said horizontal sliding slot travels through the upper and lower ends of said mounting seat, wherein a number of said elongated slot is two, and wherein said elongated slots are symmetrically arranged at both sides of said horizontal sliding slot; and
   a U-shape clamp passing through said elongated slot and is being secured to the sliding seat that is engaged in and slidable in the lower end of said mounting seat.

3. The adjustable fixture used for a cover plate of a pickup truck according to claim 2, wherein both sides of said sliding seat are provided with a positioning protrusion and a first through-hole located at the upper end of said positioning protrusion,
   wherein the end of said U-shape clamp is provided with a positioning groove corresponding to said positioning protrusion and a second through-hole coaxial with said first through-hole, and
   wherein the first bolt sequentially passes through said first through-hole and the second through-hole and then is connected to a first screw nut that is mounted on said sliding seat.

4. The adjustable fixture used for a cover plate of a pickup truck according to claim 3, wherein upper end of said first elongated slot is provided with a tension spring slot that allows the tension spring to pass through,
   wherein said tension spring slot extends upwards to the top surface of said sliding seat, wherein a top of said sliding seat is horizontally provided with a cross-bar for accommodating the tension spring, and
   wherein both sides of said tension spring slot are provided with a recess for accommodating the first screw nut; said recess is coaxial with said first through-hole.

5. The adjustable fixture used for a cover plate of a pickup truck according to claim 1, wherein said sliding block comprises a sliding block body, wherein both sides of said sliding block body extend forwards to form a slide abutting part, wherein opposite sides of these two slide abutting parts are provided with a sliding groove, wherein both sides of said sliding seat are provided with a sliding rail corresponding to said sliding groove, wherein the front end of said sliding block is provided with a tension spring mounting seat, wherein said tension spring mounting seat is located between those two slide abutting parts, and wherein said tension spring mounting seat is provided with a hole for mounting the tension spring.

6. The adjustable fixture used for a cover plate of a pickup truck according to claim 1, wherein said quick-detachable component comprises a second bolt, a second screw nut, a gasket and a driving lever, wherein said second bolt sequentially passes through said gasket, said first elongated slot and said sliding block and then is connected with said second screw nut, wherein said driving lever is rotationally hinged to the head of said second bolt through a pin roll, and wherein the root of said driving lever has an arc-shaped face and is eccentrically biased towards the rotation axis of said driving lever.

7. The adjustable fixture used for a cover plate of a pickup truck according to claim 1, wherein said mounting seat is provided with a lightening hole.

8. The adjustable fixture used for a cover plate of a pickup truck according to claim 1, wherein said mounting seat is provided with a strip-shaped recess for enhancing the structural strength, and wherein a lengthwise direction of said strip-shaped recess is parallel to the lengthwise direction of said mounting seat.

9. The adjustable fixture used for a cover plate of a pickup truck according to claim 1, wherein a lower end of said fixture block is provided with a mounting groove that is parallel to the lengthwise direction of said mounting seat, wherein an end of said mounting groove extends towards the outside of said fixture block, and wherein the bottom surface of said mounting groove is an oblique plane.

\* \* \* \* \*